United States Patent
Chen et al.

(10) Patent No.: US 12,086,608 B2
(45) Date of Patent: Sep. 10, 2024

(54) METHOD AND COMPUTING SYSTEM FOR RETURNING TO A BIOS SETUP UTILITY WHILE IN A SHELL ENVIRONMENT DURING A BOOTING PROCESS

(71) Applicant: Jabil Circuit (Singapore) Pte. Ltd., Singapore (SG)

(72) Inventors: Hung-An Chen, Taichung (TW); Ching-Yuan Wu, Taichung (TW); Shuo-Hung Hsu, New Taipei (TW)

(73) Assignee: Jabil Circuit (Singapore) Pte. Ltd., Singapore (SG)

( * ) Notice: Subject to any disclaimer, the term of this patent is extended or adjusted under 35 U.S.C. 154(b) by 62 days.

(21) Appl. No.: 18/184,178

(22) Filed: Mar. 15, 2023

(65) Prior Publication Data

US 2024/0012653 A1 Jan. 11, 2024

(30) Foreign Application Priority Data

Jul. 7, 2022 (CN) .......................... 202210794522.8

(51) Int. Cl.
*G06F 9/00* (2018.01)
*G06F 9/4401* (2018.01)

(52) U.S. Cl.
CPC .......... *G06F 9/4406* (2013.01); *G06F 9/4403* (2013.01); *G06F 9/4411* (2013.01); *G06F 9/4401* (2013.01)

(58) Field of Classification Search
CPC .... G06F 9/4406; G06F 9/4403; G06F 9/4411; G06F 9/45512; G06F 9/4401; G06F 9/5027

USPC ............................................................ 713/2
See application file for complete search history.

(56) References Cited

U.S. PATENT DOCUMENTS

| | | | | |
|---|---|---|---|---|
| 10,521,216 B2* | 12/2019 | Yu | ......................... | G06F 9/4405 |
| 11,734,429 B1* | 8/2023 | Shanmugam | ......... | G06F 21/575 |
| | | | | 713/2 |
| 2007/0006199 A1* | 1/2007 | Huang | .................... | G06F 9/545 |
| | | | | 717/162 |
| 2011/0225405 A1* | 9/2011 | Lyons | .................... | G06F 9/452 |
| | | | | 713/2 |

(Continued)

FOREIGN PATENT DOCUMENTS

| | | |
|---|---|---|
| CN | 103268241 A | 8/2013 |
| CN | 103809983 B | 10/2017 |

*Primary Examiner* — Volvick Derose
(74) *Attorney, Agent, or Firm* — Young Basile Hanlon & MacFarlane, P.C.

(57) ABSTRACT

A method for returning to a basic input/output system (BIOS) setup utility while in a shell environment during a booting process of a computing system includes: upon execution of an update Unified Extensible Firmware Interface (UEFI) (BIOS) firmware file, storing a dynamic command in a command storage; storing a back protocol in the storage module, the back protocol being linked to a back function that, when executed, causes the CPU to call a program file that, when executed by the CPU, causes the CPU to enter a BIOS setup utility, the dynamic command being linked to accessing a memory location in which the back protocol is stored; and in response to receipt of the dynamic command while in the shell environment, locating the back protocol, performing the back function and calling the specific program file, which causes the CPU to enter the BIOS setup utility.

12 Claims, 3 Drawing Sheets

(56) References Cited

U.S. PATENT DOCUMENTS

| | | | |
|---|---|---|---|
| 2014/0297999 A1* | 10/2014 | Kim | G06F 9/4401 713/1 |
| 2019/0004818 A1* | 1/2019 | Wu | G06F 9/45512 |
| 2024/0012653 A1* | 1/2024 | Chen | G06F 9/4401 |

* cited by examiner

METHOD AND COMPUTING SYSTEM FOR RETURNING TO A BIOS SETUP UTILITY WHILE IN A SHELL ENVIRONMENT DURING A BOOTING PROCESS

CROSS-REFERENCE TO RELATED APPLICATION

This application claims priority to Chinese Invention Patent Application No. 202210794522.8, filed on Jul. 7, 2022.

FIELD

The disclosure relates to a booting process of a computing system, and more particularly to a method and a computing system for returning to a BIOS setup utility while in a shell environment during a booting process.

BACKGROUND

Conventionally, a booting process for starting up a computing system (e.g., a computer, a server, etc.) is initiated after the computing system is powered on. In the booting process, a central processing unit (CPU) of the computing system executes a basic input/output system (BIOS) firmware to first implement a power on self-test (POST). After the POST is completed without issue, the booting process proceeds to execute a shell, which is a software program that provides an interface (also known as a shell environment) to a user for allowing the user to configure aspects of the computing system (e.g., the BIOS firmware, a bootloader, etc.). The shell typically includes a number of instructions for initializing the components of the computing system and a number of peripheral devices. Then, the CPU loads an operating system (OS), and the booting process is completed.

In some applications, during the booting process, it may be necessary for the user to operate the computing system in a BIOS setup utility, which enables the user to view current settings of the computing system and other information, and/or to configure the current settings of the computing system. Some examples of the configurations include changing a boot order, adjusting an order in which the components of the computing system are initialized, etc.

Typically, the BIOS setup utility may be entered by pressing a preset button on a keyboard (typically the "F2" or the "Delete" button) or by inputting a command using the keyboard while the computing system is performing the POST. It is noted that computing systems that are now commercially available can typically complete the POST in a very short time. Alternatively, while in the OS, the BIOS setup utility may be entered by rebooting the computing system (which invokes the POST), and then pressing a preset button or inputting the command while the computing system is performing the POST.

SUMMARY

One object of the disclosure is to provide a method that enables a user to return a computing system to a BIOS setup utility while in a shell environment during a booting process.

According to the disclosure, the method for returning to a BIOS setup utility while in a shell environment during a booting process of a computing system. The computing system includes a central processing unit (CPU), a storage module that stores Unified Extensible Firmware Interface (UEFI) BIOS firmware, a back function and a program file therein, and a command storage that stores a command table therein. The command table includes a plurality of commands that are associated with a shell environment. The method includes:

storing an update UEFI BIOS firmware in the storage module to overwrite the UEFI BIOS firmware, and rebooting the computing system;

after a power on self-test (POST) is completed, while in the shell environment, performing a command adding operation to store a dynamic command in the command table of the command storage;

performing a protocol adding operation to store a back protocol in the storage module, the back protocol being linked to the back function that, when executed, causes the CPU to call the program file, the program file including instructions that, when executed by the CPU, cause the computing system to enter a stage of the booting process where the CPU provides a BIOS setup utility, wherein the dynamic command is linked to accessing a specific memory location of the storage module in which the back protocol is stored; and while in the shell environment, in response to receipt of the dynamic command,
locating the back protocol stored in the storage module,
performing the back function that is linked to the back protocol, and
calling the specific program file, which causes the CPU to provide the BIOS setup utility.

Another object of the disclosure is to provide a computing system that is configured to perform the above-mentioned method.

According to the disclosure, the computing system includes:

a central processing unit (CPU);
a storage module that stores an update Unified Extensible Firmware Interface (UEFI) basic input/output system (BIOS) firmware, a back function and a program file therein; and
a command storage that stores a command table therein, the command table including a plurality of commands that are associated with a shell environment.

The CPU is configured to:
when the computing system is powered on, execute the update UEFI BIOS firmware;
after a power on self-test (POST) of the computing system is completed, while in the shell environment perform a command adding operation to store a dynamic command in the command table of the command storage;
perform a protocol adding operation to store a back protocol in the storage module, the back protocol being linked to the back function that, when executed, causes the CPU to call the program file, the program file including instructions that, when executed by the CPU, cause the computing system to enter a stage of the booting process where the CPU provides a BIOS setup utility, wherein the dynamic command is linked to accessing a specific memory location of the storage module in which the back protocol is stored; and
while in the shell environment, in response to receipt of the dynamic command,
locate the back protocol stored in the storage module,
perform the back function that is linked to the back protocol, and call the specific program file, which causes the CPU to provide the BIOS setup utility.

BRIEF DESCRIPTION OF THE DRAWINGS

Other features and advantages of the disclosure will become apparent in the following detailed description of the embodiments with reference to the accompanying drawings. It is noted that various features may not be drawn to scale.

DETAILED DESCRIPTION

Figure 1:
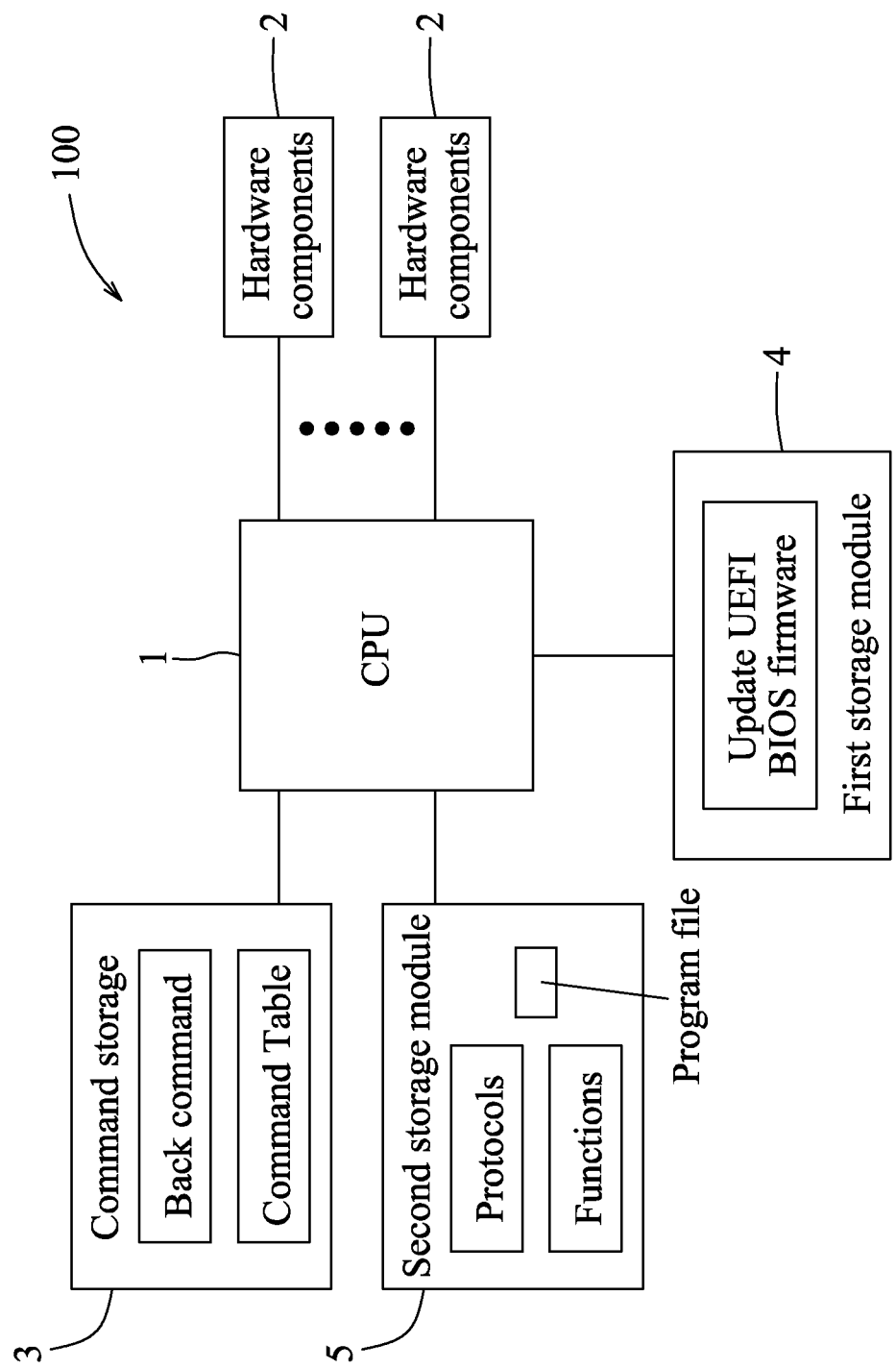
FIG. 1 is a block diagram illustrating components of a computing system according to one embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Throughout the disclosure, the term "coupled to" or "connected to" may refer to a direct connection among a plurality of electrical apparatus/devices/equipment via an electrically conductive material (e.g., an electrical wire), or an indirect connection between two electrical apparatus/devices/equipment via another one or more apparatus/devices/equipment, or wireless communication.

FIG. 1 is a block diagram illustrating components of a computing system 100 according to one embodiment of the disclosure. In this embodiment, the computing system 100 may be embodied using a server system, and includes a central processing unit (CPU) 1, a plurality of hardware components 2 connected to the CPU 1, a command storage 3 connected to the CPU 1, a first storage module 4 connected to the CPU 1, and a second storage module 5 connected to the CPU 1.

The CPU 1 may include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), and/or a radio-frequency integrated circuit (RFIC), etc.

Each of the hardware components 2 may be embodied using a memory card, or a component that is connected through a peripheral component interconnect express (PCIe) interface (e.g., an input component such as a keyboard), but is not limited to such.

The command storage 3 may be embodied using, for example, random access memory (RAM), read only memory (ROM), programmable ROM (PROM), firmware, and/or flash memory, etc. The command storage 3 is configured to store a number of commands related to the operation of the computing system 100. In this embodiment, the command storage 3 stores a command table that includes a plurality of commands associated with a shell environment, which is an interface that is provided to a user for allowing the user to configure aspects of the computing system 100 using the commands. That is to say, each of the plurality of commands is associated with a specific operation, and is available to a user operating the computing system 1 in the shell environment. The command storage 3 may also store a shell, which is a software program that provides the shell environment and which includes a number of instructions for initializing the components of the computing system 100 (including the hardware components 2). It is noted that in this embodiment, the shell is embodied using a Unified Extensible Firmware Interface (UEFI) shell, but not limited thereto, and the shell environment is embodied using a UEFI shell environment, but not limited thereto.

The first storage module 4 may be embodied using, for example, RAM, ROM, PROM, firmware, and/or flash memory, etc. In this embodiment, the first storage module 4 is configured to store UEFI basic input/output system (BIOS) firmware that is associated with a booting process of the computing system 100, but is not limited to such. In use, when the computing system 100 is powered on, the CPU 1 is configured to execute the UEFI BIOS firmware stored in the first storage module 4 so as to initiate the booting process.

The second storage module 5 may be embodied using, for example, RAM, ROM, PROM, firmware, and/or flash memory, etc. In this embodiment, the second storage module 5 is configured to store a plurality of computer protocols and computer functions (sequences of instructions for performing tasks) that are associated with the computer protocols. One of the computer protocols and one of the computer functions may be related to a BIOS setup utility, which enables the user to view current settings of the computing system and other information, and/or to configure the current settings of the computing system.

It is noted that while in this embodiment the first storage module 4 and the second storage module 5 are separate components, in other embodiments, the first storage module 4 and the second storage module 5 may be embodied using one integrated hardware storage component, e.g., a single storage module. In some embodiments, the content stored in the command storage 3 and the second storage module 5 may be stored in the first storage module 4 as a part of the UEFI BIOS firmware.

Typically, in the booting process, the CPU 1 of the computing system 100 is configured to execute the UEFI BIOS firmware stored in the first storage module 4 to first implement a power on self-test (POST). After the POST is completed without issue, the booting process continues, and the CPU 1 executes the UEFI shell that provides the UEFI shell environment, so as to allow the user to configure aspects of the computing system 100. Then, the CPU 1 loads an operating system (OS), and the booting process is completed.

In use, during the booting process, it may be necessary for the user to operate the computing system 100 in the BIOS setup utility. In this embodiment, the first storage module 4 and the second storage module 5 may also store a plurality of instructions that, when executed by the CPU 1, cause the CPU 1 to perform operations related to various stages of the booting process, (i.e., cause the CPU 1 to "enter" the various stages of the booting process) such as the POST, the BIOS setup utility, the shell environment, etc. It is noted that the operations of the CPU 1 involved with entering various stages of the booting process (e.g., the CPU 1 providing the BIOS setup utility, providing the shell environment, etc.) are abundantly well known in the related field, and the details thereof are omitted herein for the sake of brevity.

Typically, the BIOS setup utility may be entered by pressing a preset button on the keyboard (typically the "F2" or the "Delete" button) or by inputting a command using the keyboard while the computing system is performing the POST. It is noted that after the POST is completed, the option to enter the BIOS setup utility is removed, and the user may be unable to enter the BIOS setup utility during other stages of the booting process (e.g., while in the shell environment). As such, it is beneficial to provide a way for enabling the user to operate the computing system 100 to enter the BIOS setup utility during other stages of the booting process.

According to one embodiment of the disclosure, there is provided a method for returning to a BIOS setup utility while in a shell environment during a booting process. In the embodiment, the method includes a creating process and an executing process.

Figure 2:
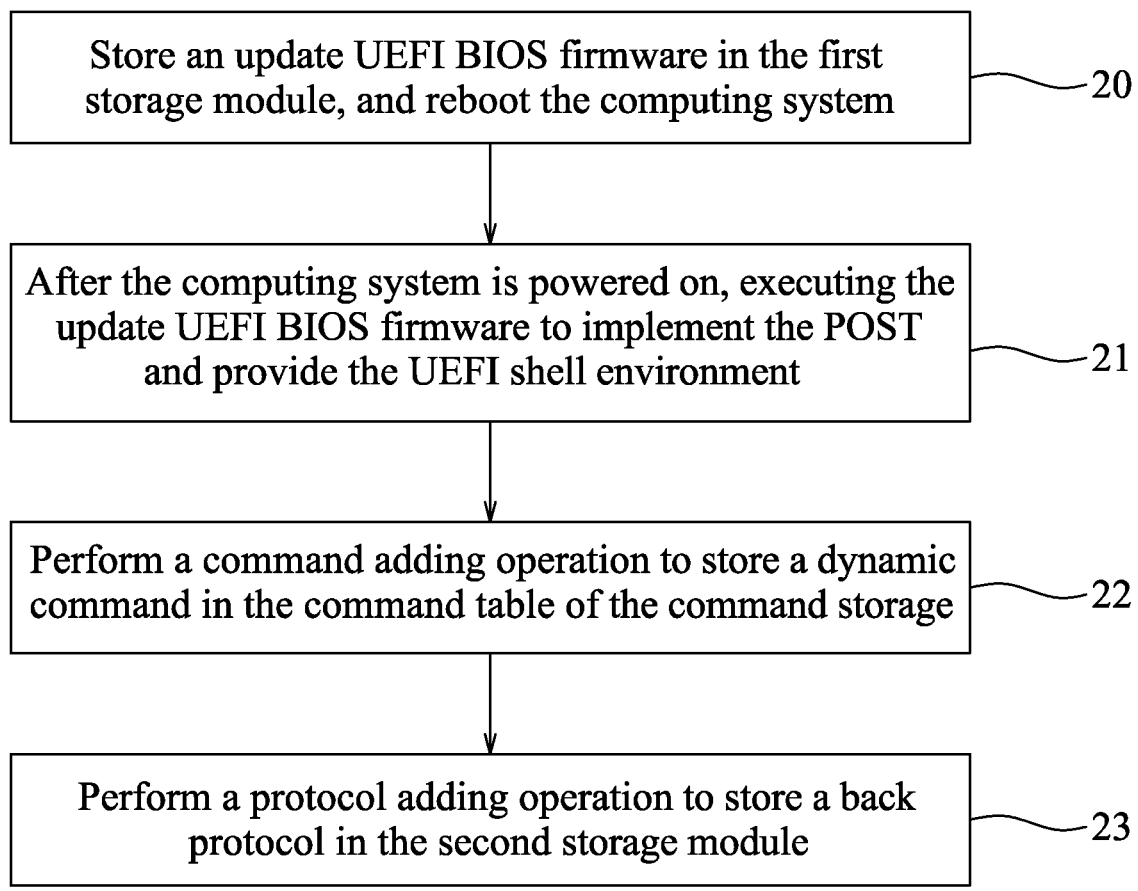
FIG. 2 is a flow chart illustrating steps of a creating process of a method for returning to a BIOS setup utility while in a shell environment during a booting process according to one embodiment of the disclosure.

FIG. 2 is a flow chart illustrating steps of the creating process of the method according to one embodiment of the disclosure. In this embodiment, the creating process is implemented by the computing system 100 of FIG. 1 that is operated by a user.

In step 20, the user operates the computing system 100 to store an update UEFI BIOS firmware in the first storage module 4, so as to overwrite the UEFI BIOS firmware originally stored therein. The update UEFI BIOS firmware includes instructions that, when executed by the CPU 1, cause the CPU 1 to perform the operations as described below. Specifically, the update UEFI BIOS firmware includes a "back" dynamic command and a back protocol.

The update UEFI BIOS firmware may be developed by the user and compiled by a compiling program, or may be in the form of a data file that can be downloaded from an external source (e.g., from an external drive that is electrically connected to the CPU 1 via the Internet, etc.). After the update UEFI BIOS firmware is obtained, the user may operate the computing system 100 to perform a firmware flashing operation (an operation also known as burning) to store the update UEFI BIOS firmware in the first storage module 4. Afterward, the computing system 100 is rebooted.

In step 21, after the computing system 100 is powered on, the CPU 1 executes the update UEFI BIOS firmware stored in the first storage module 4 to first implement the POST. After the POST is completed, the computing system 100 provides the UEFI shell environment.

In step 22, while in the UEFI shell environment, the CPU 1 executing the update UEFI BIOS firmware performs a command adding operation to store a dynamic command in the command table of the command storage 3. Specifically, the update UEFI BIOS firmware causes the CPU 1 to add the "back" dynamic command, and controls the CPU 1 to store the "back" dynamic command in the command table of the command storage 3. In response, the CPU 1 stores the "back" dynamic command in the command table of the command storage 3. It is noted that in this embodiment, the command adding operation is performed by the CPU 1 executing the update UEFI BIOS firmware during a driver phase of a UEFI driver execution environment (DXE), which is available while in the UEFI shell environment.

Then, in step 23, while in the UEFI shell environment, the CPU 1 executing the update UEFI BIOS firmware performs a protocol adding operation to store the back protocol in the second storage module 5.

Specifically, the CPU 1 adds the back protocol named a "backtosetup" protocol and stores the "backtosetup" protocol in the second storage module 5. The "backtosetup" protocol is associated with the "back" dynamic command, and is linked to a back function (named "SetgEnterSetup( )" in this embodiment) that is stored in the second storage module 5 and that, when executed, causes the CPU 1 to perform a task (e.g., calling a specific program file). In this embodiment, the back function "SetgEnterSetup( )" causes the CPU 1 to call a specific program file named "MainSetupLoopHook( )" that is in the form of a binary file package and that is provided by American Megatrends International (AMI) LLC. The program file named "MainSetupLoopHook( )" includes instructions that, when executed by the CPU 1, cause the computer system 100 to enter the stage of the booting process where the CPU 1 provides the BIOS setup utility.

While in this embodiment, the back function "SetgEnterSetup( )" and the program file "MainSetupLoopHook" are pre-stored in the second storage module 5, in other embodiments, it may be possible for the back function "SetgEnterSetup( )" and the program file "MainSetupLoopHook" to not be present in the second storage module 5, and the operation of step 22 may include storing the back function "SetgEnterSetup( )" and the program file "MainSetupLoopHook" in the second storage module 5.

It is noted that in this embodiment, the CPU 1 executing the update UEFI BIOS firmware may perform the protocol adding operation by creating a driver entry point for the back protocol. The driver entry point may be a DXE driver entry point.

In this embodiment, the command table of the command storage 3 is pre-established, and step 21 involves adding a new dynamic command to the command table of the command storage 3. On the other hand, in some embodiments, the computing system 100 is not provided with a command table, and the creating process of the method may further include, prior to step 21, a step of creating a command table in the command storage 3. This may be done by configuring the content of the update UEFI BIOS firmware prior to step 20.

In some embodiments, the command storage 3 further includes a help list that lists the dynamic commands that are stored in the command table, and associated descriptions of the effect of each of the dynamic commands. Typically, the help list is available in the shell environment for the user, by inputting the command "help." The creating process of the method may further include a step of editing the help list to include the "back" dynamic command and the associated description (e.g., "This command can be used to return to the BIOS setup utility immediately"). This may be done by configuring the content of the update UEFI BIOS firmware prior to step 20.

After the protocol adding operation, the creating process of the method is completed, and afterward, when the computing system 100 is in the shell environment, the user may operate the computing system 100 to cause the computing system 100 to enter the stage of the booting process where the CPU 1 provides the BIOS setup utility based on the executing process of the method.

Figure 3:
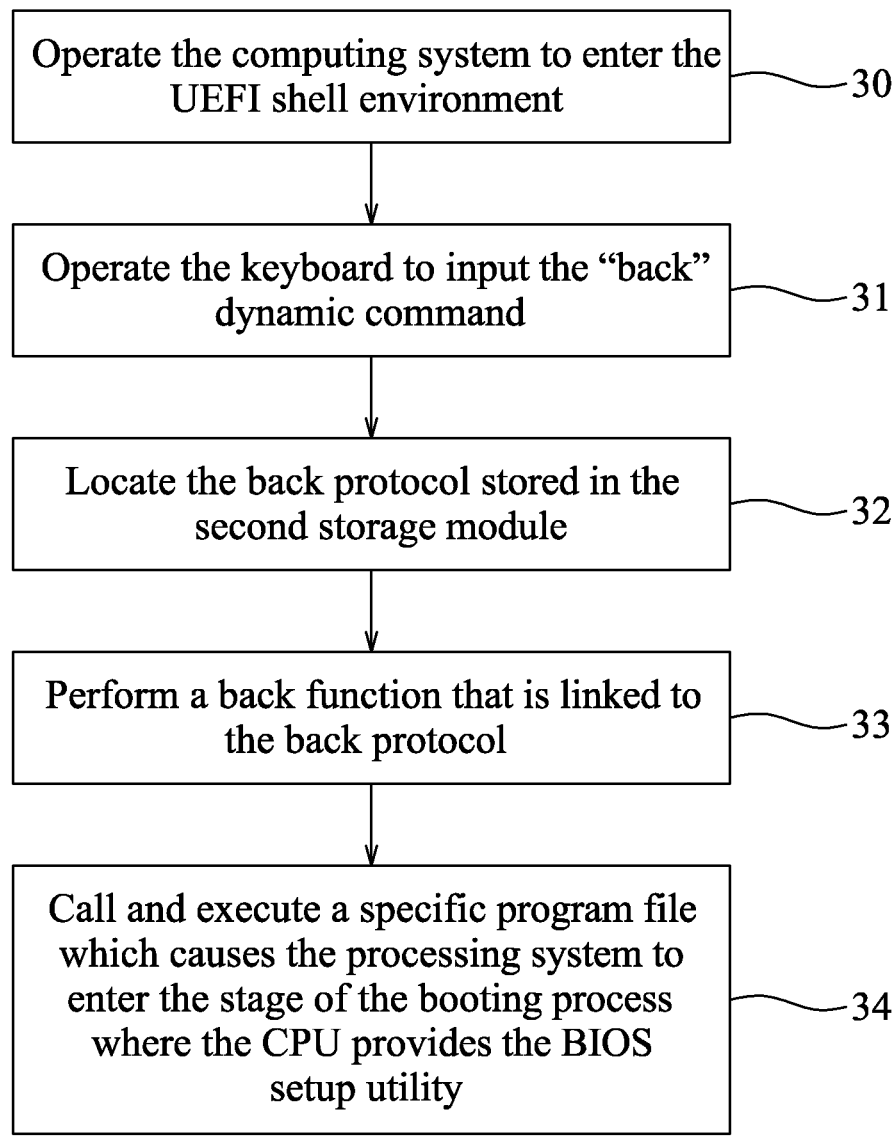
FIG. 3 is a flow chart illustrating steps of a creating process of the method according to one embodiment of the disclosure.

FIG. 3 is a flow chart illustrating steps of the executing process of the method according to one embodiment of the disclosure. In this embodiment, the executing process is implemented by the computing system 100 of FIG. 1 that is operated by a user. It is noted that the operations of the executing process of the method may be available immediately after the creating process of the method is completed. That is to say, no additional reboot is needed for the user to be able to cause the computing system 100 to enter the stage of the booting process where the CPU 1 provides the BIOS setup utility.

In step 30, the user operates the computing system 100 to enter the UEFI shell environment. Specifically, in some embodiments, the user may simply power on the computing system 100, and then the CPU 1 performs the POST, and after the POST is completed, the CPU 1 executes the plurality of instructions that are associated with the UEFI shell environment (thus providing the UEFI shell environment). In other embodiments, the user may input other commands while the computing system 100 is in different conditions.

In step 31, in the case where the user intends to operate the computing system 100 in the BIOS setup utility, he/she may operate the keyboard to input the "back" dynamic command. In this embodiment, the user may simply key in "back" to input the "back" dynamic command. In some embodiments, the user may first input the command "help" to learn of the existence of the "back" dynamic command.

Then, in step 32, in response to receipt of the "back" dynamic command, the CPU 1 locates the back protocol stored in the second storage module 5. Specifically, in this embodiment, the "back" dynamic command created in the creating process of the method is linked to accessing a specific memory location of the second storage module 5 in which the back protocol "gbacktosetup" is stored.

Afterwards, in step 33, the CPU 1 performs the back function "SetgEnterSetup( )" that is linked to the back protocol "gbacktosetup."

In step 34, the CPU 1 calls and executes the specific program file named "MainSetupLoopHook," which causes the processing system 100 to enter the stage of the booting process where the CPU 1 provides the BIOS setup utility that includes the corresponding interface for the user. Such an action may be seen as a "return" to the BIOS setup utility, since the UEFI shell environment typically occurs in a stage of the booting process that is later than the BIOS setup utility. At this stage, the executing process of the method is completed, and the method is terminated.

In brief, the method as described above provides an additional way for enabling a user to demand a "return" to the BIOS setup utility while in the shell environment (e.g., a UEFI shell environment). This may be particularly helpful for developers working on projects that involve works within the shell environment and that need frequent access to the BIOS setup utility. In the conventional computing systems, access to the BIOS setup utility is not available once the POST of the booting process is completed, and developers working in the shell environment may need to reboot the computing systems frequently just to gain access to the BIOS setup utility. As some of the computing systems take considerable time to reboot (e.g., server systems may take 5-20 minutes), frequent reboot is a significant cause of inefficiency. Using the method as described above, while working in the shell environment and a need to access the BIOS setup utility arises, the user may simply input the "back" dynamic command that is established in the creating process of the method, and in response, the CPU 1 enables access to the BIOS setup utility.

Such a design may save a considerable amount of time. In one example, for server systems that need 5 minutes to reboot, and for a one-year project (e.g., 240 working days) that involves 30 developers each needing 5 reboots per day on average, the implementation of the method may save 30*240*5*5=180000 minutes, or, 3000 working hours (or 375 total working man days, WMD).

According to one embodiment of the disclosure, there is provided a computing system that includes a CPU, a storage module, and a command storage. The storage module is connected to the CPU and stores an update Unified Extensible Firmware Interface (UEFI) basic input/output system (BIOS) firmware, a back protocol, a back function, and a program file that enables the CPU to perform operations related to a booting process including provision of a shell environment and a BIOS setup utility. The command storage stores a command table that includes a plurality of commands that are associated with a shell environment, including a dynamic command.

The dynamic command is linked to accessing a specific memory location of the storage module in which the back protocol is stored. The back protocol is linked to the back function that, when executed, causes the CPU to call the program file. The program file includes instructions that, when executed by the CPU, cause the computing system to enter a stage of the booting process where the CPU provides a BIOS setup utility. It is noted that the computing system of this embodiment also enables returning to the BIOS setup utility while in the shell environment during a booting process. Specifically, while in the shell environment, when the dynamic command is received via a keyboard, the CPU provides the BIOS setup utility.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for returning to a basic input/output system (BIOS) setup utility while in a shell environment during a booting process of a computing system, the computing system including a central processing unit (CPU), a storage module that stores Unified Extensible Firmware Interface (UEFI) BIOS firmware, a back function and a program file therein, a command storage that stores a command table therein, the command table including a plurality of commands that are associated with a shell environment, the method comprising:

storing an update UEFI BIOS firmware in the storage module to overwrite the UEFI BIOS firmware, and rebooting the computing system;

after a power on self-test (POST) is completed, while in the shell environment, performing a command adding operation to store a dynamic command in the command table of the command storage;

performing a protocol adding operation to store a back protocol in the storage module, the back protocol being linked to the back function that, when executed, causes the CPU to call the program file, the program file including instructions that, when executed by the CPU, cause the computing system to enter a stage of the booting process where the CPU provides a BIOS setup utility; and while in the shell environment, in response to receipt of the dynamic command,
- locating the back protocol stored in the storage module,
- performing the back function that is linked to the back protocol, and
- calling the specific program file, which causes the CPU to provide the BIOS setup utility.

2. The method as claimed in claim 1, wherein the shell environment is a Unified Extensible Firmware Interface (UEFI) shell environment.

3. The method as claimed in claim 1, wherein the command adding operation is performed during a driver phase of a UEFI driver execution environment (DXE), and the protocol adding operation is implemented by creating a driver entry point for the back protocol.

4. The method as claimed in claim 1, wherein the program file is in the form of a binary file package.

5. The method as claimed in claim 1, wherein the dynamic command is linked to accessing a specific memory location of the storage module in which the back protocol is stored.

6. The method as claimed in claim 1, the command storage further including a help list that lists the commands that are stored in the command table, and associated descriptions of the effect of each of the commands, the method further comprising a step of editing the help list to include the dynamic command and the associated description.

7. A computing system comprising:
a central processing unit (CPU);
a storage module that stores an update Unified Extensible Firmware Interface (UEFI) basic input/output system (BIOS) firmware, a back function and a program file therein;
a command storage that stores a command table therein, the command table including a plurality of commands that are associated with a shell environment, wherein the CPU is configured to:
when the computing system is powered on, execute the update UEFI BIOS firmware;
after a power on self-test (POST) of the computing system is completed, while in the shell environment, perform a command adding operation to store a dynamic command in the command table of the command storage;
perform a protocol adding operation to store a back protocol in the storage module, the back protocol being linked to the back function that, when executed, causes the CPU to call the program file, the program file including instructions that, when executed by the CPU, cause the computing system to enter a stage of the booting process where the CPU provides a BIOS setup utility; and
while in the shell environment, in response to receipt of the dynamic command,
- locate the back protocol stored in the storage module,
- perform the back function that is linked to the back protocol, and
- call the specific program file, which causes the CPU to provide the BIOS setup utility.

8. The computing system as claimed in claim 7, wherein the shell environment is a Unified Extensible Firmware Interface (UEFI) shell environment.

9. The computing system as claimed in claim 7, wherein the command adding operation is performed during a driver phase of a UEFI driver execution environment (DXE), and the protocol adding operation is implemented by creating a driver entry point for the back protocol.

10. The computing system as claimed in claim 7, wherein the program file stored in the storage module is in the form of a binary file package.

11. The computing system as claimed in claim 7, wherein the dynamic command is linked to accessing a specific memory location of the storage module in which the back protocol is stored.

12. The computing system as claimed in claim 7, wherein the command storage further including a help list that lists the commands that are stored in the command table, and associated descriptions of the effect of each of the commands, the method further comprising a step of editing the help list to include the dynamic command and the associated description.

* * * * *